(12) United States Patent
Chen et al.

(10) Patent No.: US 12,405,681 B2
(45) Date of Patent: Sep. 2, 2025

(54) METHOD FOR DISPLAYING STEREOSCOPIC SCENE AND ELECTRONIC DEVICE

(71) Applicant: Acer Incorporated, New Taipei (TW)

(72) Inventors: Kuan-Ju Chen, New Taipei (TW); Liang-Chi Chen, New Taipei (TW); Chao-Kuang Yang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 18/584,034

(22) Filed: Feb. 22, 2024

(65) Prior Publication Data

US 2024/0427438 A1  Dec. 26, 2024

(30) Foreign Application Priority Data

Jun. 21, 2023  (TW) .................. 112123379

(51) Int. Cl.
| | |
|---|---|
| *G06F 3/038* | (2013.01) |
| *A63F 13/23* | (2014.01) |
| *G06F 3/023* | (2006.01) |
| *H04N 13/398* | (2018.01) |

(Continued)

(52) U.S. Cl.
CPC .............. *G06F 3/038* (2013.01); *A63F 13/23* (2014.09); *G06F 3/023* (2013.01); *H04N 13/398* (2018.05); *A63F 13/803* (2014.09); *G06F 3/0338* (2013.01)

(58) Field of Classification Search
CPC . G06F 3/038; G06F 3/02; G06F 3/023; G06F 3/0338; A63F 13/23; A63F 13/803; H04N 13/398; G02B 2027/0134; G02B 30/34; G02B 30/26
See application file for complete search history.

(56) References Cited

U.S. PATENT DOCUMENTS 5,459,846 A * 10/1995 Hyatt ................. G07G 1/12
                                                711/E12.004
12,201,485 B2 * 1/2025 McDowall ............ A61B 90/37
(Continued)

FOREIGN PATENT DOCUMENTS

| CN | 113434049 A | 9/2021 | |
| TW | 201315243 A * | 4/2013 | ........... H04N 13/161 |

OTHER PUBLICATIONS

Taiwanese Office Action and Search Report for Taiwanese Application No. 112123379, dated Apr. 11, 2024.

*Primary Examiner* — Matthew A Eason
*Assistant Examiner* — Scott D Au
(74) *Attorney, Agent, or Firm* — Birch, Stewart, Kolasch & Birch, LLP

(57) ABSTRACT

A method for displaying a stereoscopic scene and an electronic device are provided. The electronic device includes a displaying unit, an inputting unit, a stereo scene generating unit, a controlling unit and an imaging unit. The inputting unit includes a hot key. If the hot key is pressed, the stereoscopic scene generating unit generates the stereoscopic scene comprising a plurality of frames. The controlling unit is used for receiving a human interface device (HID) signal from the inputting unit, and converting the HID signal into an angle signal. The imaging unit is used for displaying one of the frames of the stereoscopic scene on the displaying unit according to the angle signal.

12 Claims, 7 Drawing Sheets

(51) Int. Cl.
    *A63F 13/803*      (2014.01)
    *G06F 3/0338*      (2013.01)

(56)          References Cited

U.S. PATENT DOCUMENTS

2007/0019936 A1*  1/2007  Birkenbach ............ G03B 41/00
                                                      396/14
2013/0044191 A1*  2/2013  Matsumoto .......... H04N 13/117
                                                   348/E13.074
2013/0076736 A1*  3/2013  Seol .................... H04N 13/128
                                                      345/419
2020/0294209 A1*  9/2020  Pohl ........................ G06T 5/50
2021/0076529 A1   3/2021  Pachoud et al.
2022/0122328 A1   4/2022  Giovannetti et al.

* cited by examiner

METHOD FOR DISPLAYING STEREOSCOPIC SCENE AND ELECTRONIC DEVICE

This application claims the benefit of Taiwan application Serial No. 112123379, filed Jun. 21, 2023, the subject matter of which is incorporated herein by reference.

BACKGROUND OF THE INVENTION

Field of the Invention

The invention relates in general to a displaying method and an electronic device, and more particularly to a method for displaying a stereoscopic scene and an electronic device.

Description of the Related Art

Along with the rapid development in the multimedia and gaming industry, the user can operate stereoscopic scene with a specifically matched remote device. For instance, the user can view different angles of virtual frames through the use of a head mounted display. However, without the specifically matched remote device, the user will be unable to operate the stereoscopic scenes.

SUMMARY OF THE INVENTION

The invention is directed to a method for displaying a stereoscopic scene and an electronic device. Through the use of HID angle conversion technology, the HID signal of the inputting unit can be converted into an angle signal, so that the stereoscopic scene can be operated with various inputting units. Besides, through the use of a computational balancing mechanism, the AI inference procedure can be oriented to the artificial intelligence acceleration processor, so that the loading of the CPU or the GPU can be reduced.

According to a first aspect of the present invention, a method for displaying a stereoscopic scene is provided. The displaying method includes the following steps. Whether a hot key of an inputting unit is pressed is determined: if the hot key is pressed, the stereoscopic scene comprising a plurality of frames is generated. A human interface device (HID) signal is received from the inputting unit. The HID signal is converted into an angle signal. One of the frames of the stereoscopic scene is displayed on the displaying unit according to the angle signal.

According to a second aspect of the present invention, an electronic device is provided. The electronic device includes a displaying unit, an inputting unit, a stereo scene generating unit, a controlling unit and an imaging unit. The inputting unit includes a hot key. If the hot key is pressed, the stereoscopic scene generating unit generates a stereoscopic scene comprising a plurality of frames. The controlling unit is used for receiving a human interface device (HID) signal from the inputting unit and converting the HID signal into an angle signal. The imaging unit is used for displaying one of the frames of the stereoscopic scene on the displaying unit according to the angle signal.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1A:
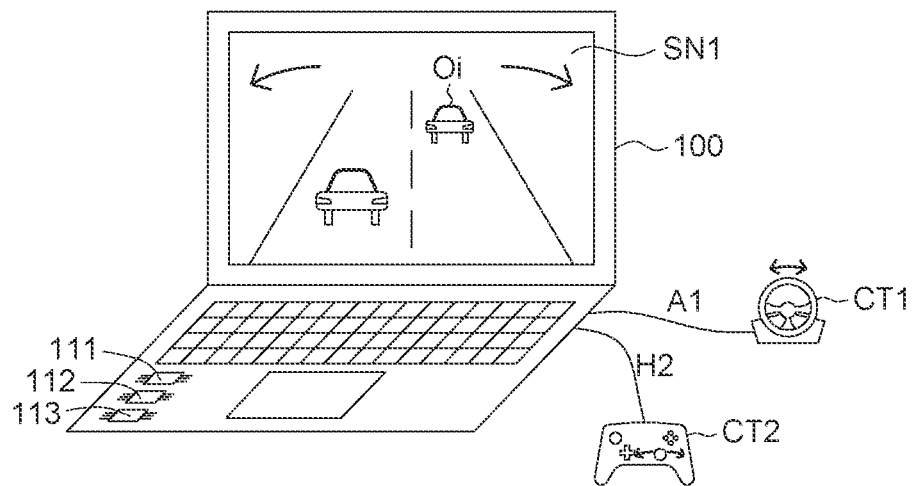
FIG. 1A is an example of operating a particular stereoscopic scene with an electronic device.

Referring to FIG. 1A, an example of operating a particular stereoscopic scene SN1 with an electronic device 100 is shown. The stereoscopic scene SN1 can be realized by a space surround image. The stereoscopic scene SN1 can be rotated either manually or automatically to display different directions of an image. When the stereoscopic scene SN1 rotates, the object Oi moves accordingly. As indicated in FIG. 1A, the stereoscopic scene SN1 can be realized by the scene of a racing game, and by default setting, the stereoscopic scene SN1 is operated with a game steering wheel CT1. When the game steering wheel CT1 rotates, an angle operating signal A1 can be inputted to rotate the stereoscopic scene SN1. Ordinary peripheral inputting units (such as game joystick CT2) only allow the input of human interface device (HID) signal H2, which does not match the racing game, therefore cannot operate the stereoscopic scene SN1.

In the present embodiment, through the use of HID angle conversion technology, the HID signal H2 of whatever peripheral inputting units (such as game joystick CT2) can be converted into an angle signal for operating the stereoscopic scene SN1.

Figure 1B:
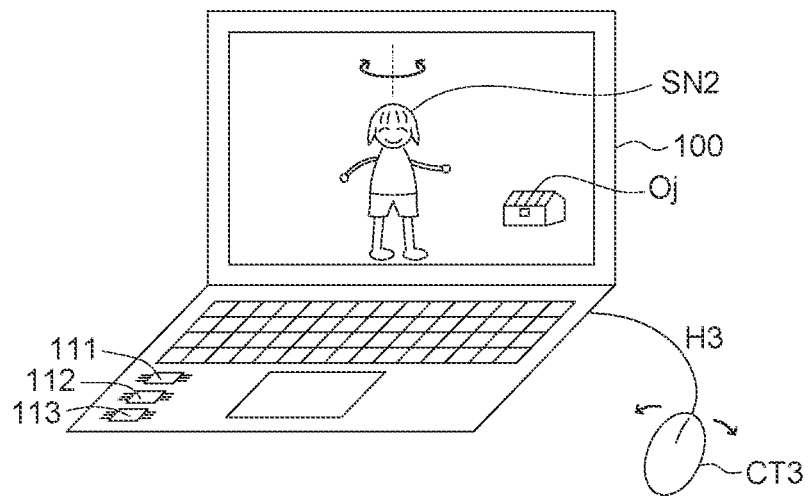
FIG. 1B is an example of operating a particular stereoscopic scene with an electronic device.

Referring to FIG. 1B, an example of operating a particular stereoscopic scene SN2 with an electronic device 100 is shown. The stereoscopic scene SN2 can be realized by a three-dimensional figure. The stereoscopic scene SN2 can be rotated either manually or automatically to display directions of an image. In the present embodiment, through the use of HID angle conversion technology, the HID signal H3 of whatever peripheral inputting units (such as game joystick CT3) can be converted into an angle signal for operating the stereoscopic scene SN2.

Besides, during the process of displaying and operating the stereoscopic scenes SN1 and SN2, the central processing unit (CPU) 111 or the graphics processing unit (GPU) 112 experiences a heavy loading. Meanwhile, if the object Oj additionally requires recognition inference, the CPU 111 or the GPU 112 will be overloaded. In the present embodiment, through the use of a computational balancing mechanism, the AI inference procedure is oriented to the artificial intelligence acceleration processor 113, so that the loading of the CPU 111 or the GPU 112 can be reduced.

Figure 2:
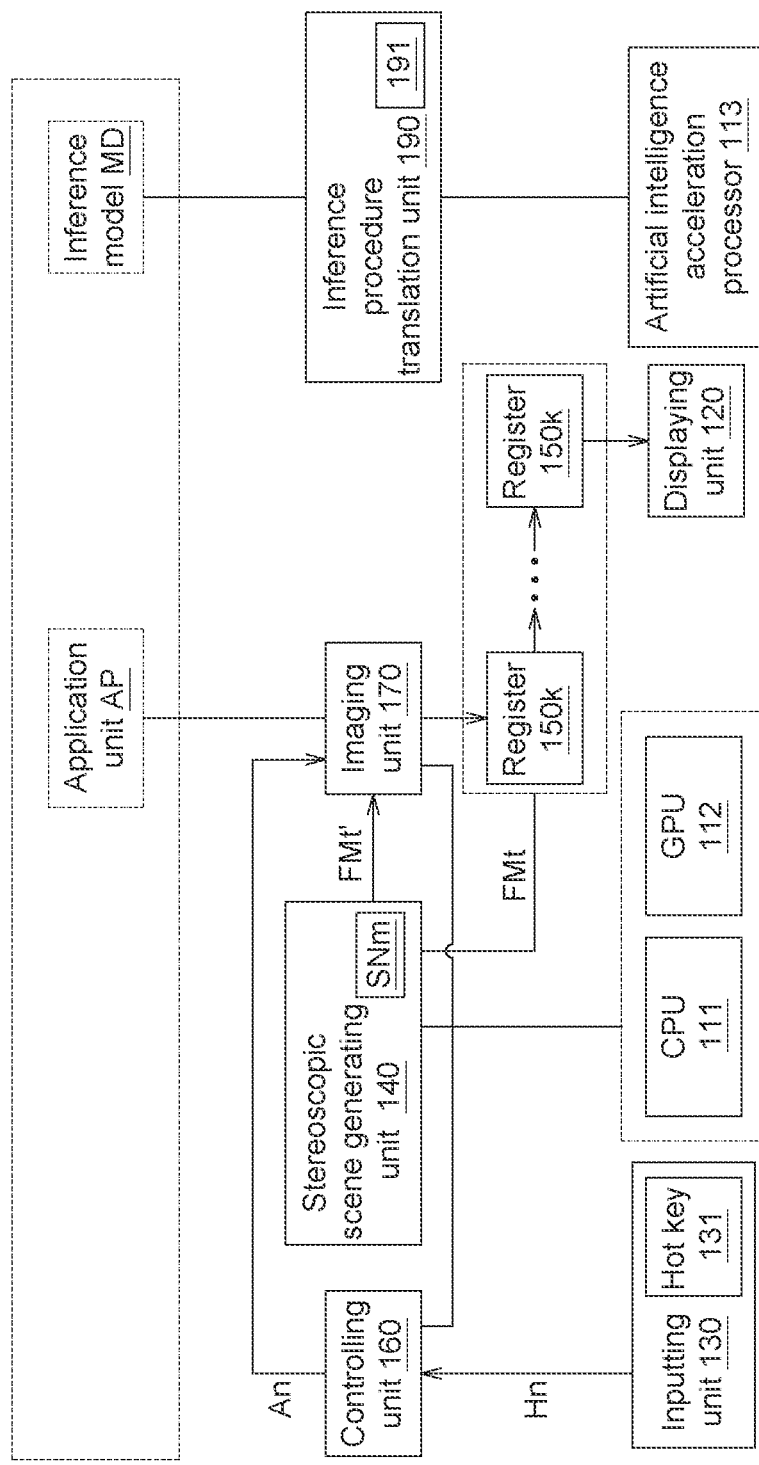
FIG. 2 is a block diagram of an electronic device according to an embodiment.

Referring to FIG. 2, a block diagram of an electronic device 100 according to an embodiment is shown. The electronic device 100 includes the said CPU 111, the said GPU 112, the said artificial intelligence acceleration processor 113, a displaying unit 120, an inputting unit 130, a stereoscopic scene generating unit 140, a plurality of registers 150k, a controlling unit 160, an imaging unit 170 and an inference procedure translation unit 190. The artificial intelligence acceleration processor 113 can be realized by a neural-network processing unit (NPU) or an intelligence processing unit (IPU). The artificial intelligence acceleration processor 113 is different from the GPU 112. The artificial intelligence acceleration processor 113 is equipped with an in memory computing function or an in memory searching structure and is applicable to the AI inference procedure.

The displaying unit 120 can be realized by a liquid crystal display panel, an OLED panel, an e-paper, a head mounted display, an AR glasses or a projector. The inputting unit 130 can be realized by a keyboard, a mouse or a joystick. The inputting unit 130 is not limited to a single device; the inputting unit 130 can also be formed of a plurality of devices. The stereoscopic scene generating unit 140, the controlling unit 160, the imaging unit 170, and the inference procedure translation unit 190 are used for executing various procedures, such as processing procedure, computing procedure, analytic procedure, and judgment procedure, and can be realized by a circuit, a circuit board, a chip, or a storage device for storing program code. The register 180k is used for temporarily storing data, and can be realized by a memory or a storage block of a hard disc. In the present embodiment, through the use of HID angle conversion technology, the controlling unit 160 can convert an HID signal Hn of the inputting unit 130 into an angle signal An for operating the stereoscopic scene SNm. Also, in the present embodiment, through the use of a computational balancing mechanism, the inference procedure translation unit 190 can orient the AI inference procedure to the artificial intelligence acceleration processor 113, so that the loading of the CPU 111 or the GPU 112 can be reduced. The operations of each element are disclosed below with accompanying drawings.

Figure 3:
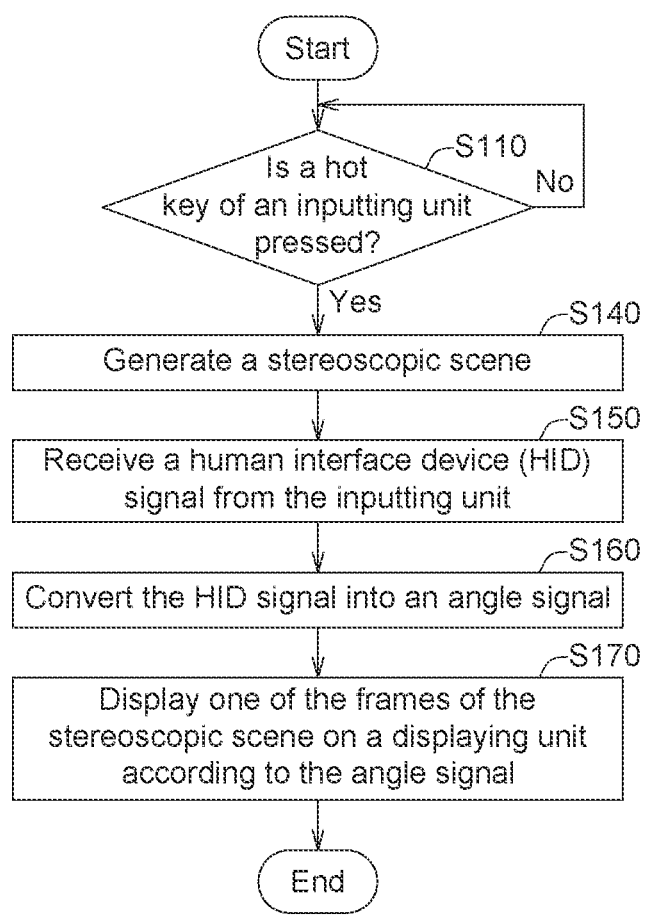
FIG. 3 is a flowchart of a method for displaying a stereoscopic scene according to an embodiment.

Referring to FIG. 3, a flowchart of a method for displaying a stereoscopic scene SNm according to an embodiment is shown. In step S110, a hot key 131 of the inputting unit 130 is pressed is determined by the controlling unit 160. The hot key 131 is a pre-defined key or a pre-defined combination of a plurality of keys. When the user requires the stereoscopic scene SNm, the user can press the hot key 131. In an embodiment, the hot key 131 can be realized by a particular function key disposed on the keyboard. If the hot key 131 is pressed, the method proceeds to step S140.

In step S140, the stereoscopic scene SNm is generated by the stereoscopic scene generating unit 140. The stereoscopic scene SNm consists of a plurality of frames FMt. The stereoscopic scene SNm can be realized by a particular space surround image (such as the stereoscopic scene SN1 of FIG. 1); the stereoscopic scene SNm can be a particular three-dimensional figure or object (such as the stereoscopic scene SN2 of FIG. 2).

Then, the method proceeds to step S150, an HID signal Hn is received from the inputting unit 130 by the controlling unit 160. The device which transmits the HID signal Hn can be different from the device equipped with the hot key 131. For instance, the device which transmits the HID signal Hn can be an external joystick, a mouse, an external touch panel, a game handle or a similar device; the device equipped with the hot key 131 can be realized by the keyboard or in-built touch panel of the device.

Then, the method proceeds to step S160, the HID signal Hn is converted into the angle signal An by the controlling unit 160.

Figure 4:
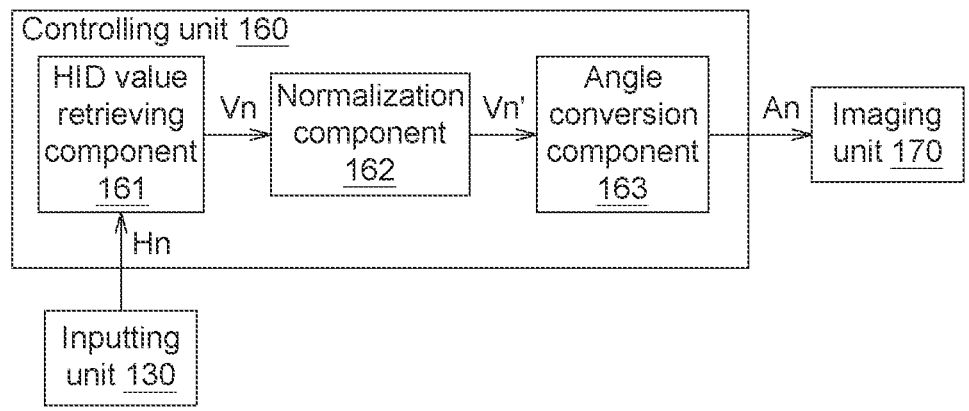
FIG. 4 is a detailed block diagram of a controlling unit according to an embodiment.
Figure 5:
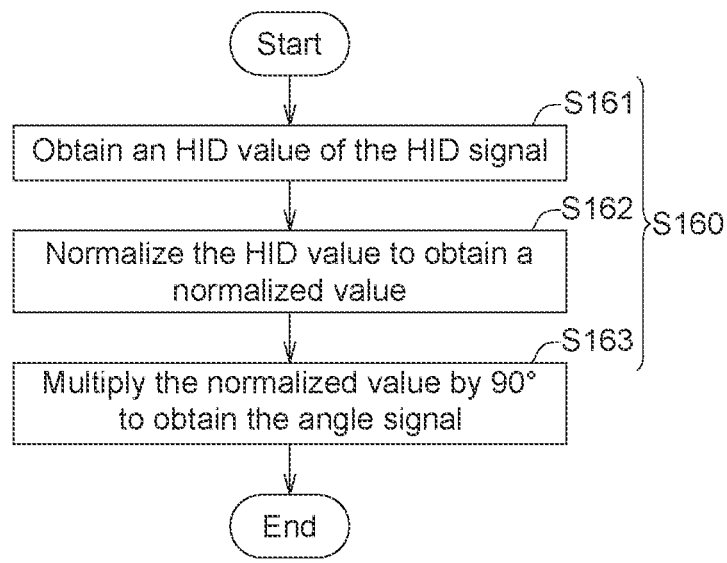
FIG. 5 is a detailed flowchart of step S160 according to an embodiment.

Refer to FIG. 4 and FIG. 5. FIG. 4 is a detailed block diagram of a controlling unit according to an embodiment. FIG. 5 is a detailed flowchart of step S160 according to an embodiment. The controlling unit 160 includes an HID value retrieving component 161, a normalization component 162 and an angle conversion component 163. Step S160 includes steps S161 to S163. In step S161, an HID value Vn of the HID signal Hn is obtained by the HID value retrieving component 161 of the controlling unit 160. For instance, when the HID signal Hn is received from a press key, the HID value Vn can be 0 or 1; when the HID signal Hn is received from a joystick mushroom head, the HID value Vn can be decimal values in the X direction and the Y direction; when the HID signal Hn is received from the touch panel, the HID value Vn can be the coordinate value of the X axis and Y axis.

Then, the method proceeds to step S162, the HID value Vn is normalized by the normalization component 162 of the controlling unit 160 to obtain a normalized value Vn'. For instance, the normalization component 162 normalizes the HID value Vn as a normalized value Vn' between −1 to 1. For instance, the maximum possible value of HID value Vn is normalized as 1; the minimum possible value of HID value Vn is normalized as −1. Or, the normalization component 162 can be normalized as two normalized values Vn' in the X direction and the Y direction according to the X axis and the Y axis, respectively.

Then, the method proceeds to step S163, the normalized value Vn' is multiplied by 90° by the angle conversion component 163 of the controlling unit 160 to obtain the angle signal An. That is, the normalized value Vn' being "1" will be converted to the angle signal An whose value is "90°"; the normalized value Vn' whose value is "−1", will be converted to the angle signal An whose value is "−90°"; the normalized value Vn' whose value is "0.5" will be converted to the angle signal An whose value is "45°", and the rest can be obtained by the same analogy.

Through steps S161 to S163, the controlling unit 160 can convert the HID signal Hn into the angle signal An.

Next, the method proceeds to step S170 of FIG. 3, a particular frame FMt' of the stereoscopic scene SNm is displayed on the displaying unit 120 by the imaging unit 170 according to the angle signal An. During the operation process of the user, different HID signals Hn generated by the inputting unit 130 can correspond to different angle signals An; the frame FMt' of the stereoscopic scene SNm that corresponds to a particular angle can be displayed on the displaying unit 120. Thus, through steps S110 to S170, the user can display the stereoscopic scene SNm with any inputting unit 130.

Figure 6:
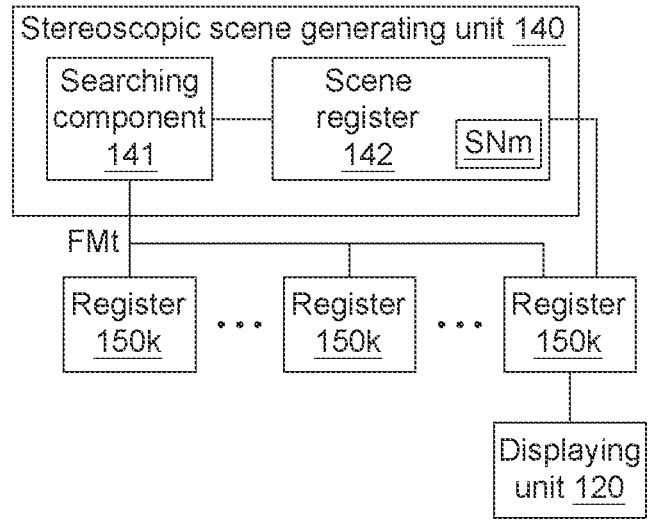
FIG. 6 is a detailed block diagram of a stereoscopic scene generating unit according to an embodiment.
Figure 7:
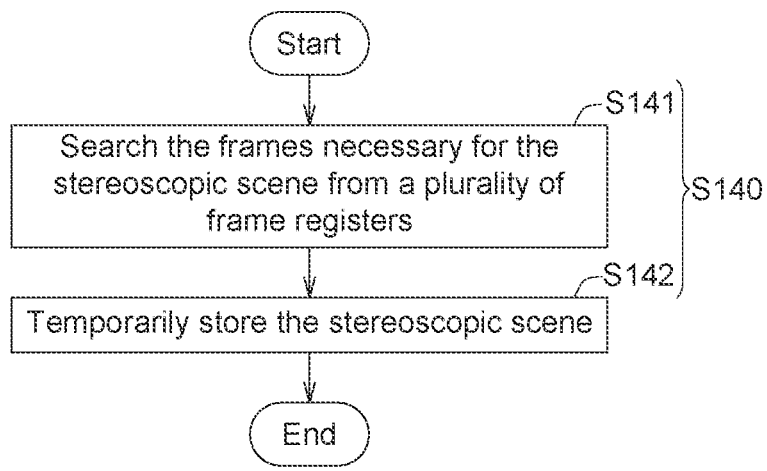
FIG. 7 is a detailed flowchart of step S140 according to an embodiment.

Refer to FIG. 6 and FIG. 7. FIG. 6 is a detailed block diagram of a stereoscopic scene generating unit according to an embodiment. FIG. 7 is a detailed flowchart of step S140 according to an embodiment. The stereoscopic scene generating unit 140 includes a searching component 141 and a scene register 142. In an embodiment, when the imaging unit 170 performs imaging, graphics information can be received from an external server connected to an application unit AP. The electronic device 100 is without the stereoscopic scene SNm, therefore requires the stereoscopic scene generating unit 140 for generating the stereoscopic scene SNm.

In step S141, the searching component 141 of the stereoscopic scene generating unit 140 searches the frame FMt necessary for the stereoscopic scene SNm from the frame register 150k. During the operation of the application unit AP, the frames need to be decoded and rendered, and different angles of the frame FMt are temporarily stored in the frame register 150k, so that the searching component 141 can collect different angles of frame FMt from the registers 150k.

Then, the method proceeds to step S142, the frames FMt are temporarily stored in the scene register 142 of the stereoscopic scene generating unit 140 to form the stereoscopic scene SNm.

Through steps S141 to S142, the stereoscopic scene generating unit 140 can generate the stereoscopic scene SNm.

Figure 8:
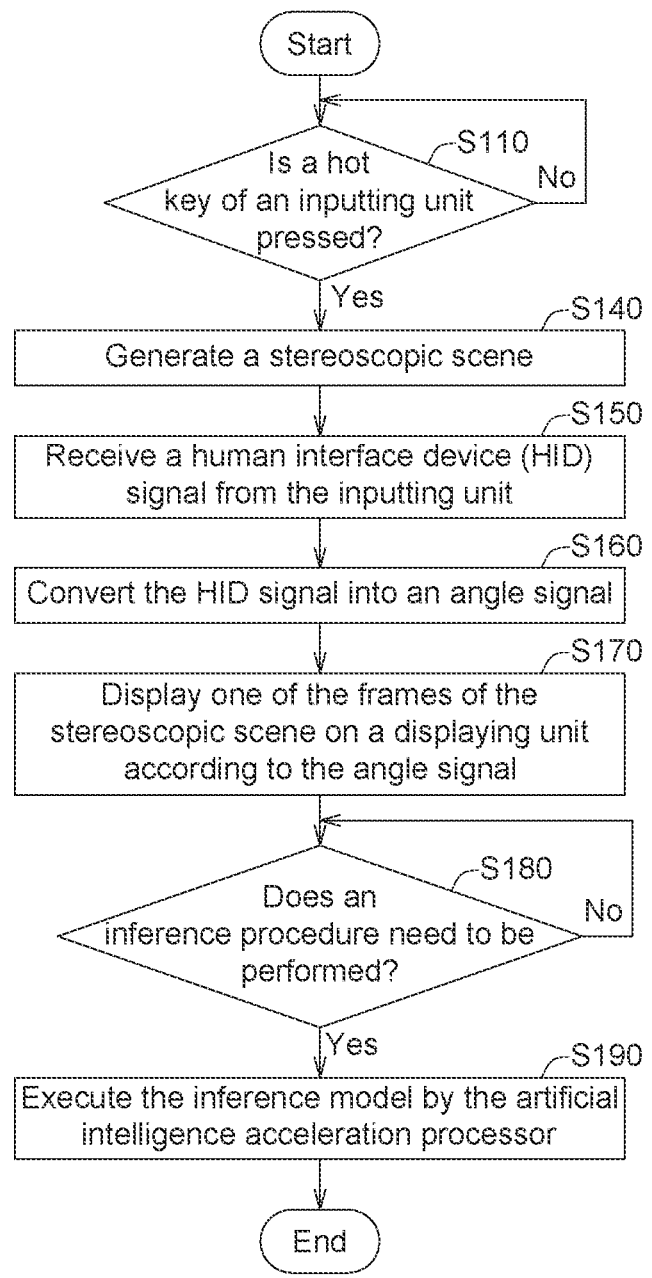
FIG. 8 is a flowchart of a method for displaying a stereoscopic scene according to another embodiment.

Referring to FIG. 8, a flowchart of a method for displaying a stereoscopic scene SNm according to another embodiment is shown. The displaying method illustrated in FIG. 8 further includes steps S180 to S190. In steps S110 to S170, the process of displaying and operating the stereoscopic scene SNm needs to be computed with the CPU 111 or the GPU 112. Meanwhile, the execution of the AI inference procedure will make the CPU 111 or the GPU 112 overloaded. In the present embodiment, through the use of a computational balancing mechanism of steps S180 to S190, the AI inference procedure is oriented to the artificial intelligence acceleration processor 113, so that the loading of the CPU 111 or the GPU 112 can be reduced.

In step S180, whether an inference procedure needs to be performed is determined by the inference procedure translation unit 190. If the inference procedure needs to be performed, the method proceeds to step S190.

In step S190, the computational balancing mechanism is activated by the inference procedure translation unit 190 to control the electronic device 100 to perform the inference procedure by the artificial intelligence acceleration processor 113.

Figure 9:
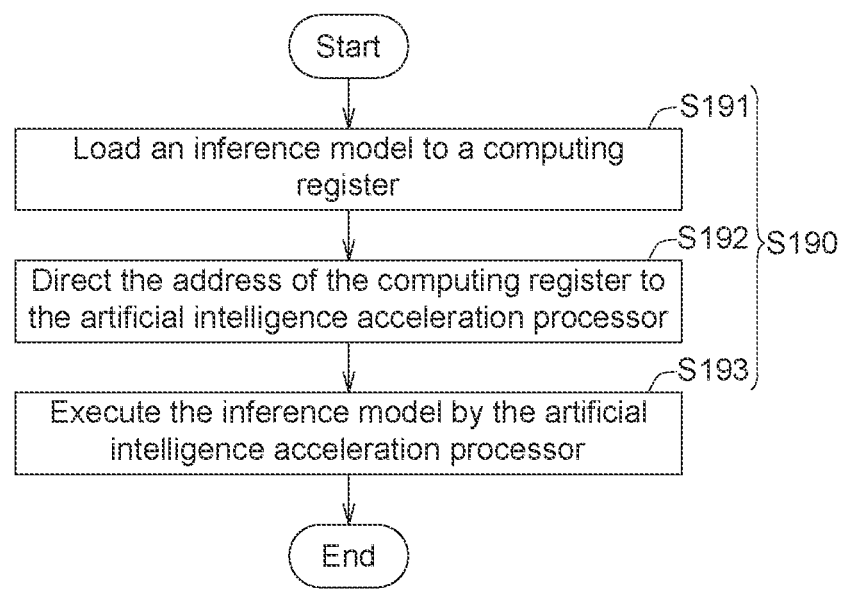
FIG. 9 is a detailed flowchart of step S190 according to an embodiment.

Referring to FIG. 9, a detailed flowchart of step S190 according to an embodiment is shown. step S190 includes steps S191 to S193. In step S191, an inference model MD is loaded to a computing register 191 by the inference procedure translation unit 190.

Next, In the method proceeds to S192, the address of the computing register 191 is directed to the artificial intelligence acceleration processor 113 by the inference procedure translation unit 190.

Then, the method proceeds to step S193, the inference model MD is executed by the artificial intelligence acceleration processor 193 to perform the inference procedure. Through steps S191 to S193, during the process of displaying and operating the stereoscopic scene SNm, the AI inference procedure will automatically be oriented to the artificial intelligence acceleration processor 193, so that the loading of the CPU 111 or the GPU 112 will not be increased.

According to the above embodiments, through the use of HID angle conversion technology, the HID signal Hn of the inputting unit 130 can be converted into an angle signal An for operating the stereoscopic scene SNm. Besides, according to the above embodiments, through the use of a computational balancing mechanism, the AI inference procedure can be oriented to the artificial intelligence acceleration processor 113, so that the loading of the CPU 111 or the GPU 112 can be reduced.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for displaying a stereoscopic scene, comprising:
    determining whether a hot key of an inputting unit is pressed;
    if the hot key is pressed, generating the stereoscopic scene comprising a plurality of frames;
    receiving a human interface device (HID) signal from the inputting unit;
    converting the HID signal into an angle signal; and
    displaying one of the frames of the stereoscopic scene on a displaying unit according to the angle signal;
    wherein the step of converting the HID signal into the angle signal comprises:
        obtaining an HID value of the HID signal;
        normalizing the HID value to obtain a normalized value; and
        multiplying the normalized value by 90° to obtain the angle signal.

2. The method for displaying the stereoscopic scene according to claim 1, wherein the normalized value is between −1 to 1.

3. The method for displaying the stereoscopic scene according to claim 1, wherein the step of generating the stereoscopic scene comprises:
    searching the frames for the stereoscopic scene from a plurality of frame registers; and
    storing the stereoscopic scene temporarily.

4. The method for displaying the stereoscopic scene according to claim 1, further comprising:
    when the stereoscopic scene is being generated and an inference procedure needs to be performed, performing the inference procedure by an artificial intelligence acceleration processor.

5. The method for displaying the stereoscopic scene according to claim 4, wherein the artificial intelligence acceleration processor is a neural-network processing unit (NPU) or an intelligence processing unit (IPU).

6. The method for displaying the stereoscopic scene according to claim 4, comprising:
    loading an inference model to a computing register;
    directing an address of the computing register to the artificial intelligence acceleration processor; and
    executing the inference model by the artificial intelligence acceleration processor to perform the inference procedure.

7. An electronic device, comprising:
    a displaying unit;
    an inputting unit, comprising a hot key;
    a stereoscopic scene generating unit, wherein if the hot key is pressed, the stereoscopic scene generating unit generates a stereoscopic scene comprising a plurality of frames;
    a controlling unit, used for receiving a human interface device (HID) signal from the inputting unit and converting the HIDD signal into an angle signal; and
    an imaging unit, used for displaying one of the frames of the stereoscopic scene on the displaying unit according to the angle signal;
    wherein the controlling unit comprises:
        an HID value retrieving component, used for obtaining an HID value of the HID signal;
        a normalization component, used for normalizing the HID value to obtain a normalized value; and an angle conversion component, used for multiplying the normalized value by 90° to obtain the angle signal.

8. The electronic device according to claim 7, wherein the normalized value is between −1 to 1.

9. The electronic device according to claim 7, wherein the stereoscopic scene generating unit comprises:
   a searching component, used for searching the frames for the stereoscopic scene from a plurality of frame registers; and
   a scene register, used for temporarily storing the stereoscopic scenes.

10. The electronic device according to claim 7, further comprising:
    an artificial intelligence acceleration processor; and
    an inference procedure translation unit, wherein when the stereoscopic scene is being generated and an inference procedure needs to be performed, the inference procedure translation unit performs the inference procedure by the artificial intelligence acceleration processor.

11. The electronic device according to claim 10, wherein the artificial intelligence acceleration processor is a neural-network processing unit (NPU) or an intelligence processing unit (IPU).

12. The electronic device according to claim 10, wherein the inference procedure translation unit loads an inference model to a computing register and directs an address of the computing register to the artificial intelligence acceleration processor, so that the artificial intelligence acceleration processor executes the inference model to perform the inference procedure.

\* \* \* \* \*